United States Patent Office 3,632,650
Patented Jan. 4, 1972

3,632,650
ALKYLATION OF DIHYDROXYBENZOPHENONE
Ingenuin Hechenbleikner, Cincinnati, John F. Hussar, Loveland, and Robert E. Bresser, Cincinnati, Ohio, assignors to Carlisle Chemical Works, Inc., Reading, Ohio
No Drawing. Filed Jan. 25, 1968, Ser. No. 700,368
Int. Cl. C07c 49/82
U.S. Cl. 260—591
12 Claims ABSTRACT OF THE DISCLOSURE
Compounds of the formula

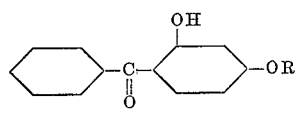

are prepared by reacting a compound having the formula RCl with 2,4-dihydroxybenzophenone in the presence of alkali and an iodide. R can be alkyl, alkenyl or aralkyl. Preferably, the reaction is carried out in the presence of a solvent.

---

The present invention relates to the preparation of monoethers of 2,4-dihydroxybenzophenone. It is known to prepare monoethers of 2,4-dihydroxybenzophenone by reacting benzoyl chloride with a 1,3-dialkoxybenzene, as shown, for example, in Hardy Pat. 2,773,903. It also has been proposed to prepare such monoethers by reacting 2,4-dihydroxybenzophenone with an alkyl bromide, as shown in Armitage Pat. 3,098,842. The latter procedure has the disadvantage that there must be employed the relatively expensive bromide since the corresponding chloride does not give as good yields. Additionally, as shown in Hardy, the yield of the desired product is only about 71% when utilizing octyl bromide and only about a percent higher when using dodecyl bromide. Accordingly, it is an object of the present invention to prepare half ethers of 2,4-dihydroxybenzophenone in better yields than has been possible in the past.

Another object is to prepare such half ethers in a more economical fashion than has previously been possible.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting 2,4-dihydroxybenzophenone with a compound having the formula RCl where R is alkyl, alkenyl, or aralkyl. The reaction is carried out under alkaline conditions in the presence of an iodide. While at first blush, it would appear that the use of an iodide would be more expensive than the use of a bromide, it should be noted that the iodide is employed in only catalytic amount and further is not used up in the reaction but can be recycled. The reaction is desirably carried out in the presence of an inert organic solvent.

Typical RCl compounds which can be used in the present invention are methyl chloride, ethyl chloride, propyl chloride, isopropyl chloride, n-butyl chloride, isobutyl chloride, secondary butyl chloride, tertiary butyl chloride, amyl chloride, hexyl chloride, cyclohexyl chloride, heptyl chloride, n-octyl chloride, isooctyl chloride, 2-ethylhexyl chloride, n-decyl chloride, isodecyl chloride, dodecyl chloride, tetradecyl chloride, hexadecyl chloride, octadecyl chloride, allyl chloride, methallyl chloride, vinyl chloride, crotyl chloride and benzyl chloride. When there is no designation as to the isomer in the above list of compounds, the normal isomer is intended. However, the other isomers of the various alkyl chlorides can be used.

As the alkaline material there can be employed sodium hydroxide, potassium hydroxide, sodium carbonate, potassium carbonate or other alkali metal hydroxide and carbonates and other strongly alkaline materials.

As the catalyst there is employed either sodium iodide, potassium iodide or a compound having the formula RI where R is as defined above. Thus, as the catalyst there can be employed n-octyl iodide, methyl iodide, ethyl iodide, isopropyl iodide, n-butyl iodide, secondary butyl iodide, tertiary butyl iodide, isobutyl iodide, amyl iodide, hexyl iodide, cyclohexyl iodide, n-heptyl iodide, 2-ethylhexyl iodide, isooctyl iodide, decyl iodide, isodecyl iodide, dodecyl iodide, tetradecyl iodide, hexydecyl iodide, octadecyl iodide, allyl iodide, methallyl iodide, crotyl iodide an benzyl iodide. The catalyst can be employed in a very small amount, e.g., one mol percent based on the dihydroxybenzophenone. Normally, there is no advantage in employing large amounts of catalyst, e.g., 50 mol percent or 100 mol percent, or more, based on the dihydroxybenzophenone. However, such large amounts of catalyst are not precluded from the invention, but their use is simply wasteful.

It appears that when an alkali metal iodide such as sodium or potassium iodide is employed as a catalyst, it is converted during the reaction to a compound of the formula RI, e.g., octyl iodide, when the starting RCl compound is, e.g., octyl chloride. There is no need to recover the RI compound formed or utilized since it is recycled to another batch for further use as a catalyst.

The alkaline material is needed as an acid acceptor. Thus, as indicated, there can be employed sodium hydroxide, potassium hydroxide or the like, or instead there can be employed the salts of 2,4-dihydroxybenzophenone, such as the mono- or disodium salts, the mono- or dipotassium salts, etc. Any acid acceptor can be employed, including, for example, the anion exchange resins such as Amberlite IRA 400 (a quaternarized styrene divinyl benzene copolymer which has been chloromethylated and treated with trimethylamine). The acid acceptor, of course, should be used in an amount sufficient to neutralize all of the hydrochloric acid which is formed in the reaction.

As stated, the reaction is preferably carried out in the presence of an inert solvent. The preferred solvent is acetone but other solvents can be employed such as methyl ethyl ketone, isopropanol, methyl isobutyl ketone, ethyl alcohol, butyl alcohol, etc. The exact amount of solvent is not critical but need only be enough to render the mixture reasonably fluid. The solvent need not be anhydrous. Thus, a mixture of 90% acetone and 10% water has been employed successfully as a solvent without any significant change in the rate of reaction.

The temperature of the reaction can be varied widely, but preferably is carried out at above room temperature. The reaction can be carried out at atmospheric, subatmospheric or superatmospheric pressure.

The RCl compound is preferably utilized in an amount at least equal to the dihydroxybenzophenone on a molar basis and preferably is employed in a slight excess. Desirably, however, the RCl compound is used in an amount less than 2 mols per mol of dihydroxybenzophenone to avoid dietherification.

Unless otherwise indicated, all parts and percentages are by weight.

EXAMPLE 1

0.10 mol of 2,-dihydroxybenzophenone, 0.125 mol of sodium carbonate, 0.125 mol of octyl chloride and 0.006 mol of potassium iodide were added to 200 ml. of acetone, and the mixture heated at 100° C. for 15 hours. The 2-hydroxy-4-n-octyloxybenzophenone formed crystallized out and was recovered in a yield of 99%.

In another run in which the potassium iodide was omitted, the yield of 2-hydroxy-4-n-octyloxybenzophenone was only 64.5%.

EXAMPLE 2

The procedure of Example 1 was repeated but the amount of potassium iodide was increased to 0.026 mol. The yield of 2-hydroxy-4-n-octyloxybenzophenone was 99%.

EXAMPLE 3

0.10 mol of 2,4-dihydroxybenzophenone, 0.125 mol of sodium carbonate, 0.125 mol of octyl chloride and 0.006 mol of potassium iodide were added to 100 ml. of acetone and were heated at 150° C. for 5 hours. The desired 2-hydroxy-4-n-octyloxybenzophenone crystallized out and was recovered in a yield of 100%. When Example 3 was repeated but the potassium iodide omitted, the yield of the product was only 33.6%.

EXAMPLE 4

The procedure of Example 3 was repeated but the potassium iodide was used in an amount of 0.015 mol. The yield of the desired 2-hydroxy-4-n-octyloxybenzophenone was 100%.

EXAMPLE 5

The effect of catalyst concentration is further shown in this example in which there was employed 1.25 mol of n-octyl chloride, 1.25 mol of sodium carbonate, one mol of 2,4-dihydroxybenzophenone and 75% by weight of the mixture of acetone.

|  | Temp., °C. | Mol percent KI[1] | Percent reaction |
|---|---|---|---|
| Time (hours): |  |  |  |
| 5 | 130 | 3 | 85 |
| 5 | 130 | 9 | 100 |
| 5½ | 110 | 6 | 22 |
| 5½ | 110 | 30 | 57 |

[1] Based on dihydroxybenzophenone.

EXAMPLE 6

The effect of the solvent on the reaction is illustrated in this example in which the proportions of the octyl chloride sodium carbonate dihydroxybenzophenone and solvent were the same as in Example 5, and the amount of potassium iodide was 6 mol percent of the dihydroxybenzophenone.

| Solvent | Temp., °C. | Percent reaction |
|---|---|---|
| Time (hours): |  |  |
| 6.5 — Acetone | 120 | 88 |
| 6.5 — Methylethyl ketone | 120 | 69 |
| 6.5 — Isopropanol | 120 | 43 |
| 6.4 — Methylisobutyl ketone | 120 | 9 |

EXAMPLE 7

The procedure of Example 1 was repeated replacing the octyl chloride by allyl chloride, and there was obtained 2-hydroxy-4-allyloxybenzophenone in good yields.

EXAMPLE 8

The octyl iodide formed in Example 1 was recovered and recycled to a mixture of 0.10 mol of dihydroxybenzophenone, 0.125 mol of sodium carbonate, 0.125 mol of octyl chloride and sufficient potassium iodide to give 0.006 mol of total iodide in 200 ml. of acetone and the mixture heated to 100° C. for 15 hours to again obtain a substantially quantitative yield of 2-hydroxy-4-n-octyloxybenzophenone.

EXAMPLE 9

Example 1 was repeated replacing the potassium iodide by 0.006 mol of n-octyl iodide to obtain substantially quantitative yields of 2-hydroxy-n-octyloxybenzophenone.

EXAMPLE 10

Example 1 was repeated replacing the octyl chloride by 0.125 mol of methyl chloride to obtain 2-hydroxy-4-methoxybenzophenone in good yields.

EXAMPLE 11

The procedure of Example 1 was repeated replacing the octyl chloride by 0.125 mol of octadecyl chloride to obtain 2-hydroxy-4-n-octadecoxybenzophenone in good yields.

EXAMPLE 12

The procedure of Example 1 was repeated replacing the octyl chloride by 0.125 mol of benzyl chloride to obtain 2-hydroxy-4-benzyloxybenzophenone in good yields.

We claim:

1. In a process of reacting one mole of 2,4-dihydroxybenzophenone under alkaline conditions with at least one mole, but less than two moles of a compound having the formula RCl where R is alkyl, aralkyl or alkenyl, the improvement comprising carrying out the reaction in the presence of an alkaline material and in the presence of from 1 to 30 mol percent based on the dihydroxybenzophenone of a catalyst which is an alkali metal iodide or RI, the alkaline material being used in an amount sufficient to neutralize all of the hydrochloric acid formed in the reaction.

2. A process according to claim 1 carried out in an inert organic solvent.

3. A process according to claim 2 wherein the solvent is acetone.

4. A process according to claim 2 wherein R is alkyl.

5. A process according to claim 4 wherein the solvent is acetone.

6. A process according to claim 5 wherein R is n-octyl.

7. A process according to claim 2 wherein the catalyst comprises RI.

8. A process according to claim 2 wherein the catalyst comprises sodium iodide of potassium iodide.

9. A process according to claim 2 wherein the catalyst comprises RI recycle from a previous run.

10. A process according to claim 1 wherein the catalyst comprises sodium iodide or potassium iodide in an amount of 3 to 30 mol percent based on the dihydroxybenzophenone.

11. A process according to claim 10 wherein R is alkyl of up to 18 carbon atoms.

12. A process according to claim 10 where R is allyl.

References Cited

UNITED STATES PATENTS 2,962,533  11/1960  Hardy et al. _____ 260—591
2,976,259  3/1961  Hardy et al. _____ 260—591

DANIEL D. HORWITZ, Primary Examiner